United States Patent
Niimoto et al.

(10) Patent No.: US 9,540,521 B2
(45) Date of Patent: Jan. 10, 2017

(54) ANTIFOULING COATING COMPOSITION, ANTIFOULING COATING FILM AND ANTIFOULING SUBSTRATE, AND METHOD FOR PRODUCING ANTIFOULING SUBSTRATE

(71) Applicant: CHUGOKU MARINE PAINTS, LTD., Otake-shi (JP)

(72) Inventors: Jyunji Niimoto, Otake (JP); Junnai Ikadai, Otake (JP); Kenji Yamamoto, Otake (JP); Hideyuki Tanaka, Otake (JP)

(73) Assignee: CHUGOKU MARINE PAINTS, LTD., Otake-shi (JP)

( * ) Notice: Subject to any disclaimer, the term of this patent is extended or adjusted under 35 U.S.C. 154(b) by 327 days.

(21) Appl. No.: 14/356,279

(22) PCT Filed: Nov. 14, 2012

(86) PCT No.: PCT/JP2012/079524
§ 371 (c)(1),
(2) Date: May 5, 2014

(87) PCT Pub. No.: WO2013/073580
PCT Pub. Date: May 23, 2013

(65) Prior Publication Data
US 2014/0315030 A1    Oct. 23, 2014

(30) Foreign Application Priority Data

Nov. 14, 2011  (JP) ................. 2011-248877

(51) Int. Cl.
| | | |
|---|---|---|
| *B32B 9/04* | (2006.01) | |
| *C09D 5/16* | (2006.01) | |
| *A01K 75/00* | (2006.01) | |
| *B63B 59/04* | (2006.01) | |
| *C09D 143/04* | (2006.01) | |
| *C08F 30/08* | (2006.01) | |

(52) U.S. Cl.
CPC ............ *C09D 5/1675* (2013.01); *A01K 75/00* (2013.01); *B63B 59/04* (2013.01); *C08F 30/08* (2013.01); *C09D 5/1662* (2013.01); *C09D 143/04* (2013.01)

(58) Field of Classification Search
CPC ..... B63B 59/04; C09D 5/1675; C09D 5/1662; C08F 30/08
See application file for complete search history.

(56) References Cited

U.S. PATENT DOCUMENTS

| | | | |
|---|---|---|---|
| 5,436,284 A | 7/1995 | Honda et al. | |
| 5,795,374 A | 8/1998 | Itoh et al. | |
| 6,458,878 B1 * | 10/2002 | Tsuboi | ................ C08F 230/08 523/122 |
| 7,977,407 B1 | 7/2011 | Mori et al. | |
| 2004/0236130 A1 | 11/2004 | Plehiers et al. | |
| 2011/0166253 A1 | 7/2011 | Mori et al. | |

FOREIGN PATENT DOCUMENTS

| | | | |
|---|---|---|---|
| EP | 1 260 513 A1 | 11/2002 | |
| EP | 2 161 316 A1 | 3/2010 | |
| EP | 2161316 A1 * | 3/2010 | ............... C09D 5/16 |
| JP | 7-102193 A | 4/1995 | |
| JP | 10-30071 A | 2/1998 | |
| JP | 2001-151830 A | 6/2001 | |
| JP | 2001-226440 A | 8/2001 | |
| JP | 2001-348533 A | 12/2001 | |
| JP | 2002-53796 A | 2/2002 | |
| JP | 2002-53797 A | 2/2002 | |
| JP | 2005-82725 A | 3/2005 | |
| JP | 4340777 B2 | 10/2009 | |
| JP | 2010-84099 A | 4/2010 | |
| JP | 2010-235877 A | 10/2010 | |
| WO | WO 2009/001619 A1 | 12/2008 | |
| WO | WO 2009/066632 A1 | 5/2009 | |
| WO | WO 2010/071180 A1 | 6/2010 | |

OTHER PUBLICATIONS

Extended European Search Report issued May 28, 2015 in Patent Application No. 12849170.1.
International Search Report issued Feb. 19, 2013 in PCT/JP2012/079524.

* cited by examiner

*Primary Examiner* — Eisa Elhilo
(74) *Attorney, Agent, or Firm* — Oblon, McClelland, Maier & Neustadt, L.L.P.

(57) ABSTRACT

The antifouling coating composition according to the present invention includes a silylacrylic copolymer including a structural unit (1) derived from triisopropylsilyl methacrylate (i), a structural unit (2) derived from triisopropylsilyl acrylate (ii) and a structural unit (3) derived from a polymerizable monomer having a polymerizable double bond (iii), which excludes the above (i) and (ii), the silylacrylic copolymer satisfies specific requirements. Thus, an antifouling coating composition that is excellent in long-term storage stability and gives a coating film excellent in long-term antifouling properties and long-term water resistance can be provided.

11 Claims, No Drawings

ANTIFOULING COATING COMPOSITION, ANTIFOULING COATING FILM AND ANTIFOULING SUBSTRATE, AND METHOD FOR PRODUCING ANTIFOULING SUBSTRATE

TECHNICAL FIELD

The present invention relates to an antifouling coating composition that has long-term storage stability and gives a coating film exhibiting excellent antifouling properties and water resistance (long-term mechanical properties); an antifouling coating film formed therefrom and an antifouling substrate having such a coating film; and antifouling substrate production method.

BACKGROUND ART

The surfaces of substrates such as ships, underwater structures and fishing nets that are exposed to water for a long term easily undergo the adherence thereto of various aquatic creatures including animals such as oyster, mussel and barnacle, plants such as layer, and bacteria. The propagation of these aquatic creatures on the substrate surfaces would cause various problems: where the substrate is a ship, for example, the surface roughness increases from the waterline to the bottom of a ship, resulting in the decrease in the speed of a ship and increase in fuel cost of a ship. Where the substrate is a fishing net such as a culturing net and a fixed net, the clogging of the mesh by aquatic creatures could cause serious problems such as the death of cultured creatures and caught fish because of oxygen deficiency. Where the substrate is a water supply and exhaust pipe for seawater of e.g., a thermal power plant and a nuclear power plant, it may happen that the water supply and exhaust pipe for seawater (cooling water) is clogged or flow rate is decreased to disturb circulation systems.

Regarding such problems, in order to prevent the adherence of aquatic creatures onto various substrates, the research and development of antifouling paints to be applied on the substrates (antifouling coating composition) are underway.

As a conventional antifouling coating composition, a coating composition containing a hydrolyzable resin as a resin component (binder component) is known. As a typical example thereof, a coating composition containing a hydrolyzable resin having a triorganosilyl group has been developed. Such a coating composition is applied on the bottom of ships and the like in order to prevent aquatic creatures from adhering thereto.

The hydrolyzable resins having a triorganosilyl group that are generally known are the ones obtained by (co)polymerizing as a monomer component triisopropylsilyl acrylate (TIPSA) and/or triisopropylsilyl methacrylate (TIPSMA). For example, the following Patent Literatures 1 to 7 disclose antifouling coating compositions containing these (co)polymers.

Patent Literature 1 discloses a coating composition composed of a copolymer containing 55 to 75 parts by weight of tri-i-propylsilyl (meth)acrylate (a), 2 to 20 parts by weight of methoxyethyl acrylate (b) and 43 to 5 parts by weight of other polymerizable monomer (c), with respect to of 100 parts by weight of total monomer components, and an antifouling agent.

Patent Literature 2 discloses an antifouling coating composition containing, as a vehicle, a copolymer obtainable from a specific triorganosilyl methacrylate monomer, a specific alkoxyalkyl methacrylate monomer and an ethylenic unsaturated monomer copolymerizable with these monomers.

Patent Literature 3 discloses an antifouling coating composition containing a copolymer obtained from a specific triorganosilyl methacrylate monomer and a specific methoxyalkyl methacrylate monomer, and rosin copper salt or a rosin derivative copper salt.

Patent Literature 4 discloses a coating composition containing, as essential components, a copolymer obtained from silyl-based monomer having an acryloyloxy group and a specific monomer, and an antifouling agent.

Patent Literature 5 discloses a coating composition containing, as essential components, a rosin-based compound, an organosilyl ester group-having polymer obtained from a silyl-based monomer having acryloyloxy group and the like, and an antifouling agent.

Patent Literature 6 discloses an antifouling coating composition containing a triisopropylsilyl (meth)acrylate copolymer obtainable by copolymerizing triisopropylsilyl (meth)acrylate, methyl methacrylate and another (meth)acrylic acid ester and having a specific glass transition temperature and a specific number average molecular weight; a rosin copper salt or a rosin derivative copper salt; and cuprous oxide.

Patent Literature 7 discloses an antifouling coating composition containing a polymer obtained by polymerizing a polymerizable unsaturated carboxylic triorganosilyl and having a number average molecular weight of 1000 to 20000, and a rosin zinc salt or a rosin derivative zinc salt.

CITATION LIST

Patent Literature

Patent Literature 1: JP-A-2001-226440
Patent Literature 2: JP-A-2005-82725
Patent Literature 3: WO2010/071180
Patent Literature 4: JP-A-07-102193
Patent Literature 5: JP-A-10-30071
Patent Literature 6: JP-B-4340777
Patent Literature 7: WO2009/066632

SUMMARY OF THE INVENTION

Technical Problem

However, antifouling coating compositions containing, as a hydrolyzable resin component, a homopolymer or copolymer of TIPSA or TIPSMA that are disclosed in Patent Literature 1 to 7 need to be improved in terms of their properties, as follows.

According to the study of the present inventors, the antifouling coating film formed from the antifouling coating composition containing a homopolymer of TIPSA is good in terms of its coating film consumption property (renewability), but allows hydrolysis reaction within the coating film to take place relatively early and thus tends to undergo cracking not long after immersed in water. In addition, the homopolymer of TIPSA becomes readily decomposed during the production of coating material or the storage of coating material by the incorporation of moisture and temperature increase. Particularly in the presence of divalent metallic ions, the viscosity of the resulting coating material is increased with the passage of time.

The coating material viscosity is increased presumably when the homopolymer, from which a triisopropylsilyl group is released, becomes an acid polymer (having a carboxyl group at its side chains), and carboxyl groups are bonded to one another via a divalent metal ion such as a copper ion and a zinc ion derived from cuprous oxide and zinc oxide, respectively, and are three-dimensionally cross-linked.

On the other hand, the antifouling coating composition containing a homopolymer of TIPSMA has good storage stability and generally has high water resistance, thus making it difficult for hydrolysis reaction to progress within the coating film relatively early. However, this composition has poor coating film consumption property (renewability), and therefore gives an antifouling coating film that has insufficient static antifouling properties. For example, this antifouling coating film, when often used for ships staying in port, exhibits insufficient antifouling properties. In addition, because TIPSMA has a high Tg, this antifouling coating film tends to have an excessively high hardness, and thus cannot follow flexure as well as swelling and shrinkage of ship steel plates, easily causing cracking.

The coating compositions containing any of TIPSA and TIPSMA copolymers disclosed in the Patent Literatures 1 to 7 enable its antifouling coating film to have improved coating film consumption property and static antifouling properties. However, appearance properties and adhesion of their antifouling coating films when immersed in seawater (particularly when immersed for a long term), and storage stability of such coating compositions have not been improved sufficiently in a balanced manner yet.

As described above, it has been impossible for conventional coating compositions containing a triorganosilyl group-having hydrolyzable resin to form antifouling coating films satisfactorily exhibiting all of antifouling properties, appearance properties and adhesion and for such conventional coating compositions to exhibit satisfactory storage stability, and thus the respective properties have been under trade-off relationship among one another.

In view of the failure to overcome the problems by such conventional antifouling coating compositions containing triisopropylsilyl (meth)acrylate polymers, the present inventors found that by allowing a copolymer of triisopropylsilyl methacrylate and triisopropylsilyl acrylate to have specific ratios of structural units derived from respective monomers, it is possible for an antifouling coating composition to have good long-term storage stability, and for a coating film formed from said coating composition to have good long-term antifouling properties and long-term water resistance, with good balance.

That is, it is an object of the present invention to provide an antifouling coating composition that is excellent in long-term storage stability and gives a coating film excellent in long-term antifouling properties and long-term water resistance.

It is another object of the present invention to provide an antifouling coating film and an antifouling substrate that are prepared by using the coating composition and being excellent in long-term antifouling properties and long-term water resistance; and a method for producing an antifouling substrate excellent in long-term antifouling properties and long-term water resistance.

Technical Solution

The antifouling coating composition according to the present invention comprises a silylacrylic copolymer (A) that comprises a structural unit (1) derived from triisopropylsilyl methacrylate (i), a monomer structural unit (2) derived from triisopropylsilyl acrylate (ii) and a structural unit (3) derived from a polymerizable monomer having a polymerizable double bond (iii), which excludes the above (i) and (ii), and satisfies the following Requirements 1 and 2;

Requirement 1: the content weight ratio ([(1)+(2)]/(3)) of the total weight ((1)+(2)) of the structural unit (1) and the structural unit (2) to the content weight of the structural unit (3) is 50/50 to 90/10; and Requirement 2: the content weight ratio ((1)/(2)) of the content weight of the structural unit (1) to the content weight of the structural unit (2) is more than 50/50 and not more than 95/5.

In the antifouling coating composition of the present invention, the polymerizable monomer (iii) is preferably an ester having a polymerizable double bond, or a carboxylic acid having a polymerizable double bond.

It is preferable that the antifouling coating composition of the present invention further comprises a rosin and/or a monocarboxylic acid compound (B).

It is preferable that in the antifouling coating composition of the present invention, the content weight ratio ($W_A/W_B$) of the content weight ($W_A$) of the silylacrylic copolymer (A) to the content weight ($W_B$) of the rosins and/or monocarboxylic acid compound (B) is 99.9/0.1 to 30/70.

It is preferable that the antifouling coating composition of the present invention further comprises at least one selected from the group consisting of a copper compound (C), an organic antifouling agent (D), and other additive(s) (E) including a plasticizer (e1), an extender pigment (e2), a pigment dispersant (e3), a coloring pigment (e4), an anti-sagging agent (e5), an anti-settling agent (e6) and a dehydrating agent (e7), and a solvent (F).

The antifouling coating film according to the present invention is formed by curing the antifouling coating composition.

The antifouling substrate according to the present invention is formed by coating or impregnating a substrate with the antifouling coating composition, and curing the coating composition, which is used to coat or impregnate the substrate, to thereby form an antifouling coating film on the substrate.

It is preferable that the antifouling substrate of the present invention contacts with seawater or fresh water.

It is preferable that in the antifouling coating film of the present invention, the substrate is at least one selected from the group consisting of an underwater structure, a ship and a fishing gear.

A method for producing an antifouling substrate according to the present invention comprises coating or impregnating a substrate with the antifouling coating composition; and curing the coating composition, which is used to coat or impregnate the substrate, to thereby form an antifouling coating film on the substrate.

The silylacrylic copolymer, which is used as a binder component of the antifouling coating composition, according to the present invention comprises a structural unit (1) derived from triisopropylsilylmethacrylate (i), a monomer structural unit (2) derived from triisopropylsilyl acrylate (ii) and a structural unit (3) derived from a polymerizable monomer having a polymerizable double bond (iii), which excludes the above (i) and (ii), the silylacrylic copolymer satisfying the following Requirements 1 and 2;

Requirement 1: the content weight ratio ([(1)+(2)]/(3)) of the total weight ((1)+(2)) of the structural unit (1) and the structural unit (2) to the content weight of the structural unit (3) is 50/50 to 90/10; and Requirement 2: the content weight ratio ((1)/(2)) of the content weight of the structural unit (1) to the content weight of the structural unit (2) is more than 50/50 and not more than 95/5.

Advantageous Effects of the Invention

The antifouling coating composition according to the present invention is excellent in long-term storage stability (in particular, less increase in its viscosity during long-term storage) and gives a coating film excellent in long-term antifouling properties (in particular static antifouling properties) and long-term water resistance (long-term mechanical properties: adhesion, abrasion resistance, crack resistance, and appearance properties such as fracture, of a coating film when immersed in water, particularly seawater), with good balance. The antifouling coating film and the antifouling substrate according to the present invention exhibit excellent long-term antifouling properties and long-term water resistance (long-term mechanical properties) with good balance. Furthermore, the method for producing the antifouling substrate according to the present invention can provide an antifouling substrate exhibiting excellent long-term antifouling properties and long-term water resistance.

EMBODIMENTS OF THE INVENTION

Hereinafter, the antifouling coating composition, the antifouling coating film and the antifouling substrate, and the antifouling substrate production method, according to the present invention, are described in detail.
[Antifouling Coating Composition]
The antifouling coating composition of the present invention (antifouling paint) comprises a specific silylacrylic copolymer (A). The antifouling paint of the present invention may contain an optional component according to purpose.
1. Silylacrylic Copolymer (A)
The silylacrylic copolymer (A) comprises a structural unit (1) derived from triisopropylsilyl methacrylate (i), a monomer structural unit (2) derived from triisopropylsilyl acrylate (ii) and a structural unit (3) derived from a polymerizable monomer (iii) having a polymerizable double bond, which excludes the above (i) and (ii).
This silylacrylic copolymer satisfies the following Requirements 1 and 2.
Requirement 1: the content weight ratio ([(1)+(2)]/(3)) of the total weight ((1)+(2)) of the structural unit (1) and the structural unit (2) to the content weight of the structural unit (3) is 50/50 to 90/10, desirably 60/40 to 80/20, in terms of improving coating film hydrolyzability (consumption property), static antifouling properties and the like.
Requirement 2: the content weight ratio ((1)/(2)) of the content weight of the structural unit (1) to the content weight of the structural unit (2) is more than 50/50 and not more than 95/5, desirably 60/40 to 90/10, in terms of improving coating film water resistance (mechanical properties), coating film hydrolyzability (consumption property), static antifouling properties, storage stability and the like.

For convenience sake, the content weight ratios in the Requirement 1 and the Requirement 2 are also called the content weight ratio (I) and the content weight ratio (II), respectively.

It is preferred that the silylacrylic copolymer (A) is contained in the antifouling coating composition of the present invention usually in an amount of 10 to 50% by weight, preferably 15 to 30% by weight, in terms of improving coating workability, long-term storage stability, coating film water resistance (mechanical properties), coating film hydrolyzability (consumption property), static antifouling properties, coating film appearance and the like. It is preferred that the silylacrylic copolymer (A) is contained, with respect to 100% by weight of the solid content (heat residue or non-volatile content) of the antifouling coating composition of the present invention, usually in an amount of about 5 to 50% by weight, preferably about 10 to 30% by weight, in terms of improving coating workability, long-term storage stability, coating film water resistance (mechanical properties), coating film hydrolyzability (consumption property), static antifouling properties and coating film appearance. The solid content (heat residue) contained in the antifouling coating composition is obtained by keeping 1.5 g of the antifouling coating composition in a thermostat chamber at 125° C. for 1 hour to remove volatile contents.

The polymerizable monomer having a polymerizable double bond (iii) refers to a monomer excluding the triisopropylsilyl methacrylate (i) and the triisopropylsilyl acrylate (ii) and having a polymerizable double bond (for example, vinyl group, (meth)acryloyl group), and is copolymerized with the above (i), (ii) or the monomer (iii).

The polymerizable monomer (iii) is preferably an ester having a polymerizable double bond, or a carboxylic acid having a polymerizable double bond. The polymerizable monomer (iii), by being such compounds, achieves good compatibility with the triisopropylsilyl methacrylate (i) and the triisopropylsilyl acrylate (ii), and has reactivity with the triisopropylsilyl methacrylate (i) that is a similar degree to reactivity with the triisopropylsilyl acrylate (ii). Therefore, the produced silylacrylic copolymer (A) has structural units derived from respective monomers which are uniformly (randomly) incorporated, and has good compatibility also with respect to a solvent. In other words, when the polymerization reactivity is extremely different among respective monomers and the copolymerization of respective monomers is difficult, a problem such that copolymers having structural units in a non-uniform manner or homopolymers are obtained is caused. By contrast, when the polymerizable monomer (iii) is the compounds described above, the occurrence of the above problem is reduced, and stable production of the silylacrylic copolymer (A) is achieved.

Examples of the ester and the carboxylic acid used as the polymerizable monomer (iii), which exclude the triisopropylsilyl methacrylate (i) and the triisopropylsilyl acrylate (ii), include (meth)acrylic acid esters, monocarboxylic acids, dicarboxylic acids and half-esters (monoester), diesters and vinyl esters thereof. Examples of the polymerizable monomer (iii) other than the esters and the carboxylic acids include styrenes.

Specific examples of the polymerizable monomer (iii) include (meth)acrylic acid esters such as methyl (meth)acrylate, ethyl(meth)acrylate, butyl(meth)acrylate, 2-ethylhexyl (meth)acrylate, lauryl (meth)acrylate, tridecyl (meth)acrylate, stearyl (meth)acrylate, allyl (meth)acrylate, cyclohexyl (meth)acrylate, benzyl (meth)acrylate, isobonyl (meth)acrylate, methoxy (meth)acrylate, ethoxy (meth)acrylate, glycidyl (meth)acrylate, tetrahydrofurfuryl (meth)acrylate, hydroxyethyl (meth)acrylate, hydroxypropyl (meth)acrylate, hydroxybutyl (meth)acrylate;

monocarboxylic acids such as (meth)acrylic acids;

dicarboxylic acids such as itaconic acid, maleic acid and succinic acid, and half-esters (monoesters) and diesters thereof;

styrenes such as styrene and α-methyl styrene; and
vinyl esters such as vinyl acetate and vinyl propionate.

These are used singly, or two or more kinds thereof may be combined.

The silylacrylic copolymer (A) preferably has a weight average molecular weight of 5000 to 100000, more preferably 10000 to 60000. By employing the silylacrylic copolymer (A) having a weight average molecular weight falling within these ranges, the antifouling coating composition gives a coating film that has good hydrolyzability and has much improved static antifouling properties and further excellent long-term mechanical properties (e.g. adhesion of the antifouling coating film of the present invention to a substrate, an under-coating film and the like, and appearance properties such as cracking of the antifouling coating film, in the case of immersion in water for a long term).

The value of the weight average molecular weight is that as measured by gel permeation chromatography (GPC), and determined by using standard polystyrene calibration curve. The GPC conditions in molecular weight measurement are as follows.

GPC Conditions
Pump: "HLC-8120GPC" (manufactured by Tosoh Corporation)
Column: "SuperH2000+H4000" (manufactured by Tosoh Corporation, 6 mm (inner diameter), 15 cm (length) for each column)
Eluent: tetrahydrofran (THF)
Other Conditions
Flow rate: 0.500 ml/min.
Detector: RI
Column thermostat chamber temperature: 40° C.
Standard substance: polystyrene
Sample preparation method: To a solution containing the copolymer (A), a small amount of calcium chloride is added to dehydrate the solution, which is followed by filtration with a membrane filter. The obtained filtered material is used as a sample for GPC measurement.

In the silylacrylic copolymer (A), the content weight ratio ([(1)+(2)]/(3)) (the content weight ratio (I)) of the total weight ((1)+(2)) of the structural unit (1) and the structural unit (2) to the content weight of the structural unit (3) is 50/50 to 90/10, preferably 55/45 to 85/15, more preferably 60/40 to 80/20.

When the content weight ratio (I) is within the above range, it is possible to obtain an antifouling coating composition having good coating film hydrolyzability (consumption property), static antifouling properties and coating film water resistance (mechanical properties).

The content weight ratio ((1)/(2)) (the content weight ratio (II)) of the content weight of the structural unit (1) to the content weight of the structural unit (2) is more than 50/50 and not more than 95/5, preferably 55/45 to 90/10, more preferably 60/40 to 85/15, particularly preferably 65/35 to 80/20.

When the content weight ratio (II) is within the above range, the antifouling coating film formed from the antifouling coating composition, when immersed in water, particularly seawater, exhibits sufficient coating film consumption property (renewability), and therefore exhibits good long-term antifouling properties such as static antifouling properties, making it possible for cracking to occur less often for a long term.

The silylacrylic copolymer (A) is prepared by copolymerizing the triisopropylsilyl methacrylate (i), the triisopropylsilyl acrylate (ii) and the polymerizable monomer having a polymerizable double bond (iii) by a known polymerization method. An exemplary polymerization method is a radical or ionic polymerization in solution polymerization, bulk polymerization, semi-batch polymerization, suspension polymerization, coordination polymerization, living polymerization or emulsification polymerization.

In particular, in terms of improving the productivity and manufacturing workability of the silylacrylic copolymer (A) as well as preparing the copolymer (A) having low viscosity, it is preferable to subject the above (i)-(iii) to solution polymerization by using an organic solvent commonly used such as toluene, xylene, methyl isobutyl ketone and n-butyl acetate. When the copolymer (A) has a low viscosity as described above, the amount of a solvent added to reduce the viscosity of the antifouling coating composition can be lowered, leading to the decrease in the VOC value. The reduced viscosity of the antifouling coating composition can enhance the coating workability of the coating composition, and the appearance properties (leveling properties) and the like of the antifouling coating film.

As radical polymerization catalysts, known ones can be widely used, such as azo compounds such as 2,2'-azobis(2-methylbutyronitrile) (AMBN), 2,2'-azobis(2,4-dimethylvaleronitrile) and 2,2'-azobis-isobutyronitrile; and peroxides such as benzoylperoxide, t-butylperoxy-2-ethylhexanoate, t-butylperoxybenzoate, t-butylperoxyoctoate, as described in JP-A-2001-151830, paragraph [0099] and the like.

The ratio of charge (weight) of the above (i) to (iii), which are monomers subjected to polymerization reaction, tends to correspond to the content (weight) ratio of the structural units (1) to (3) contained in the resultant copolymer, respectively. Thus, regarding the Requirements 1 and 2, the content weight ratio (I) and the content weight ratio (II) can be controlled to be desired ones, based on the amounts (weights) of charge of (i) to (iii) and on the weight ratio of charge ((i)/(ii) or ((i)+(ii))/((i)+(ii)+(iii))).

2. Rosin or Monocarboxylic Acid Compound (B)

The antifouling coating composition of the present invention may comprise a rosin or a monocarboxylic acid compound (B), in terms of promoting the elution of the antifouling agent from the antifouling coating film formed from the composition in order to improve particularly static antifouling properties. Examples of the rosin used herein include rosins such as gum rosin, wood rosin and tall oil rosin, and rosin derivatives such as a hydrogenated rosin and a disproportionated rosin. Examples of the monocarboxylic acid compound include aliphatic or alicyclic monocarboxylic acids, monocarboxylic acid derivatives thereof and metal salts thereof.

Specific examples of the monocarboxylic acid compounds include naphthenic acid, cycloalkenylcarboxylic acids, bicycloalkenylcarboxylic acids, versatic acid, trimethyl isobutenyl cyclohexene carboxylic acid, stearic acid, hydroxystearic acid, salicylic acid, and metal salts thereof.

In the antifouling coating composition of the present invention, the content weight ratio ($W_A/W_B$) of the content weight ($W_A$) of the copolymer (A) to the content weight ($W_B$) of the rosin or monocarboxylic acid compound (B) is preferably 99.9/0.1 to 30/70, more preferably 95/5 to 35/65, still more preferably 90/10 to 40/60. When the content weight ratio is within these ranges, the grindability (coating film consumption property) of the antifouling coating film formed from the antifouling coating composition is increased, and thereby the antifouling properties (in particular static antifouling properties) can be enhanced.

3. Copper Compound (C)

The antifouling coating composition of the present invention, in order to provide an antifouling coating film formed from the antifouling coating composition that has further improved antifouling properties, may further comprise a copper compound (C). The copper compound may be any of organic or inorganic copper compounds, with examples thereof including cuprous oxide, copper thiocyanate, cupronickel and copper pyrithione.

In the antifouling coating composition of the present invention, the content of the copper compound (C), with respect to 100 parts by weight of the copolymer (A), is preferably 10 to 800 parts by weight, more preferably 100 to 750 parts by weight, in terms of improving long-term antifouling properties of the antifouling coating film. The content of the copper compound (C), with respect to 100% by weight of the antifouling coating composition (containing a solvent), is usually about 0.1 to 70% by weight, preferably about 0.1 to 60% by weight.

It is preferable that these copper compounds are copper compounds that do not contain 2% or more of metallic copper based on their total weight.

4. Organic Antifouling Agent (D)

The antifouling coating composition of the present invention may further comprise an organic antifouling agent (D), in order to provide the antifouling coating film formed from the antifouling coating composition that has further improved antifouling properties, particularly improved antifouling effects on plant marine organism. The organic antifouling agent (D) is not particularly limited as long as being organic compounds that provide the antifouling coating film with antifouling properties, excluding the above-mentioned organic copper compounds.

Examples of the organic antifouling agent (D) include metal pyrithiones such as zinc pyrithione, 4,5-dichloro-2-n-octyl-4-isothiazolin-3-one, 4-bromo-2-(4-chlorophenyl)-5-(trifluoromethyl)-1H-pyrrole-3-carbonitrile, pyridinetriphenylborane, N,N-dimethyldichlorophenylurea, 2,4,6-trichlorophenylmaleimide, 2,4,5,6-tetrachloroisophthalnitrile, bisdimethyldithiocarbamoylzinc ethylenebisdithiocarbamate, chloromethyl-n-octyldisulfide, N,N'-dimethyl-N'-phenyl-(N-fluorodichloromethylthio)sulfamide, tetraalkylthiuramdisulfide, zinc dimethyldithiocarbamate, zinc ethylenebisdithiocarbamate, 2,3-dichloro-N-(2',6'-diethylphenyl)maleimide and 2,3-dichloro-N-(2'-ethyl-6'-methylphenyl)maleimide.

In the antifouling coating composition of the present invention, the content of the organic antifouling agent (D), with respect to 100 parts by weight of the copolymer (A), is preferably 0.1 to 500 parts by weight, more preferably 0.5 to 300 parts by weight, in terms of allowing the antifouling coating film formed from the antifouling coating composition to have improved maintenance of long-term antifouling properties and coating film water resistance (maintaining of mechanical properties). The content of the organic antifouling agent (D), with respect to 100% by weight of the antifouling coating composition (containing a solvent), is usually about 0.1 to 30% by weight, preferably about 0.1 to 20% by weight.

5. Other Additive(s) (E)

The antifouling coating composition of the present invention may comprise at least one additive (E) selected from the group consisting of a plasticizer (e1), an extender pigment (e2), a pigment dispersant (e3), a coloring pigment (e4), an anti-sagging agent (e5), an anti-settling agent (e6) and a dehydrating agent (e7). Hereinafter, these additives (E) are described in detail.

Plasticizer (e1)

It is preferable that the antifouling coating composition of the present invention comprises a plasticizer (e1) in order to give an antifouling coating film that has improved crack resistance. Examples of the plasticizer (e1) include paraffin chloride (chlorinated paraffin), petroleum resins, ketone resins, TCP (tricresyl phosphate), polyvinyl ethyl ether and dialkylphthalate. In terms of allowing the antifouling coating film formed from the antifouling coating composition to have improved coating film water resistance (mechanical properties) and coating film hydrolyzability (consumption property), the plasticizer (e1), among these, is preferably paraffin chloride (chlorinated paraffin), petroleum resins or ketone resins. The plasticizer (e1) may be used singly, or two or more kinds thereof may be combined.

Paraffin chloride may have any of linear molecular structure or branched molecular structure, and may be at a liquid state or a solid state (for example: powder state) under room temperature (for example: 23° C.) condition.

Paraffin chloride has carbons in which the average number of carbons in one molecule is usually 8 to 30, preferably 10 to 26. An antifouling coating composition containing such paraffin chloride can form an antifouling coating film that has less cracking (fracture) and peeling. If the average number of carbons is less than 8, the effect of suppressing the occurrence of cracks in the antifouling coating film may become insufficient. On the other hand, if the average number of carbons is more than 30, an antifouling coating film may have decreased hydrolyzability (renewability, grindability), thus having deteriorated antifouling properties.

The paraffin chloride usually has a viscosity (unit: Poise, measurement temperature: 25° C.) of 1 or more, preferably 1.2 or more, and usually has a specific gravity (25° C.) of 1.05 to 1.80, preferably 1.10 to 1.70.

The paraffin chloride usually has a chlorination percentage (chlorine content) with respect to 100% by weight of paraffin chloride, of 35 to 70% by weight, preferably 35 to 65% by weight. By containing the paraffin chloride having such chlorination percentage, the antifouling coating composition can form a coating film that has less cracking (fracture), peeling and the like. Specific examples of such paraffin chloride include "TOYOPARAX 150" and "TOYOPARAX A-70" (both of which are manufactured by Tosoh Corporation).

Examples of the petroleum resins include C5-based ones, C9-based ones, styrene-based ones, dichloropentadiene-based ones, and hydrogenated products thereof. Specific examples of the petroleum resins include "Quintone 1500" and "Quintone 1700" (both of which are manufactured by Zeon Corporation).

In the antifouling coating composition of the present invention, the content of the plasticizer (e1), with respect to 100 parts by weight of the copolymer (A), is preferably 0.1 to 300 parts by weight, more preferably 0.1 to 200 parts by weight, still more preferably 0.1 to 150 parts by weight, in terms of allowing the antifouling coating film formed from the antifouling coating composition to have improved coating film hydrolyzability (consumption property), antifouling properties and coating film water resistance (mechanical properties).

The content of the plasticizer (e1), with respect to 100% by weight of the antifouling coating composition (containing a solvent), is usually about 0.1 to 30% by weight, preferably about 0.1 to 20% by weight.

Extender Pigment (e2)

The extender pigment (e2) can provide the antifouling coating film formed from the antifouling coating composition with improved coating film properties such as crack resistance.

Examples of the extender pigment (e2) include talc, silica, mica, clay, potassium feldspar, zinc oxide, calcium carbonate, kaolin, aluminum white, white carbon, aluminum hydroxide, magnesium carbonate, barium carbonate and barium sulfate. Among these, preferred are talc, silica, mica, clay, calcium carbonate, kaolin, barium sulfate, potassium feldspar and zinc oxide. Calcium carbonate and white carbon are used also as an anti-settling agent (e6) described later and a matting agent.

In the antifouling coating composition of the present invention, the content of the extender pigment (e2), with respect to 100 parts by weight of the copolymer (A), is preferably 0.1 to 500 parts by weight, more preferably 50 to 300 parts by weight, in view of allowing the antifouling coating film formed from the antifouling coating composition to have improved coating film water resistance (mechanical properties) and antifouling properties and coating film hydrolyzability (consumption property).

The content of the extender pigment (e2) is, with respect to 100% by weight of the antifouling coating composition (containing a solvent), usually about 0.1 to 50% by weight, preferably about 0.1 to 40% by weight.

Pigment Dispersant (e3)

Examples of the pigment dispersant (e3) include known various organic and inorganic pigment dispersants. Examples of the pigment dispersants include aliphatic amines or organic acids ("Duomeen TDO" manufactured by Lion Co., Ltd.; "Disperbyk-101" manufactured by BYK CHEMIE).

In the antifouling coating composition of the present invention, the content of the pigment dispersant (e3), with respect to 100 parts by weight of the copolymer (A), is preferably 0.01 to 100 parts by weight, more preferably 0.01 to 50 parts by weight in terms of improving the effect of reducing the coating material viscosity of the antifouling coating composition and the effect of preventing the flooding of the antifouling coating film.

The content of the pigment dispersant (e3), with respect to 100% by weight of the antifouling coating composition (containing a solvent), is usually about 0.1 to 10% by weight, preferably about 0.1 to 5% by weight.

Coloring Pigment (e4)

The antifouling coating composition of the present invention may comprise a coloring pigment (e4) in order to provide the antifouling coating film formed from the antifouling coating composition with controlled hue and desired hue.

Examples of the coloring pigment (e4) include various known organic and inorganic coloring pigments. Examples of the organic coloring pigments include carbon black, naphthol red and phthalocyanine blue. Examples of the inorganic coloring pigments include red iron oxide, barite powder, titanium white, and yellow iron oxide.

The antifouling coating composition of the present invention may comprise, together with the coloring pigment (e4) or instead of the coloring pigment (e4), a colorant excluding the coloring pigment (e4), such as dyes.

In the antifouling coating composition of the present invention, the content of the coloring pigment (e4), with respect to 100 parts by weight of the copolymer (A), is preferably 0.01 to 100 parts by weight, more preferably 0.01 to 10 parts by weight, in terms of allowing the antifouling coating film formed from the antifouling coating composition to have improved coloring properties, shielding properties, exposure discoloration properties, antifouling properties, and coating film water resistance (mechanical properties).

The content of the coloring pigment (e4), with respect to 100% by weight of the antifouling coating composition (containing a solvent), is usually about 0.1 to 30% by weight, preferably about 0.1 to 20% by weight.

Anti-Sagging Agent (e5)

The antifouling coating composition of the present invention may comprise an anti-sagging agent (e5) (also called an anti-running agent) in terms of reducing the occurrence of the sagging of the coating composition upon coating the substrate with the antifouling coating composition.

Examples of the anti-sagging agent (e5) include amide wax, hydrogenated castor oil-based wax, mixtures thereof and synthetic fine powder silica. The anti-sagging agent (e5) is particularly preferably amide wax or synthetic fine powder silica. By using amide wax or synthetic fine powder silica as the anti-sagging agent (e5), it is possible to improve the storage stability of the antifouling coating composition; and moreover when the formation of the antifouling coating film is followed by the formation, on such an antifouling coating film, of a coating film (over-coating film) made of the same kind of coating composition (antifouling coating composition) or different kinds of coating compositions, it is possible to prevent decrease of adhesion between the antifouling coating film and the over-coating film (interlayer adhesion, over coating properties).

Examples of commercially available products of the anti-sagging agent (e5) include "DISPARLON A630-20XC" manufactured by KUSUMOTO CHEMICALS, CO., LTD. and "ASAT-250F" manufactured by ITO OIL CHEMICALS CO., LTD.

In the antifouling coating composition of the present invention, the content of the anti-sagging agent (e5), with respect to 100 parts by weight of the copolymer (A), is preferably 0.1 to 100 parts by weight, more preferably 0.1 to 50 parts by weight. The content of the anti-sagging agent (e5), with respect to 100% by weight of the antifouling coating composition (containing a solvent), is usually about 0.1 to 20% by weight, preferably about 0.1 to 10% by weight. When the content of the anti-sagging agent (e5) is set at the range described above, it is possible to allow the antifouling coating composition to have improved storage stability; and moreover when the formation of the antifouling coating film is followed by the formation, on such an antifouling coating film, of a coating film (over-coating film) made of the same kind of coating composition (antifouling coating composition) or different kinds of coating compositions, it is possible to prevent decrease of adhesion between the antifouling coating film and the over-coating film (interlayer adhesion, over coating properties).

Anti-Settling Agent (e6)

The antifouling coating composition of the present invention may comprise an anti-settling agent (e6) in terms of preventing the coating composition during storage from having precipitates and allowing the coating composition to have improved stirring properties.

Examples of the anti-settling agent (e6) include amine salts of Al, Ca or Zn of organoclay, polyethylene wax and polyethylene oxide-based wax. In particular, the anti-settling agent (e6) is preferably polyethylene oxide-based wax. An example of commercially available products of the polyethylene oxide-based wax is "DISPARLON4200-20X" (manufactured by Kusumoto Chemical Ltd.).

In the antifouling coating composition of the present invention, the content of the anti-settling agent (e6), with respect to 100 parts by weight of the copolymer (A), is preferably 0.1 to 100 parts by weight, more preferably 0.1 to 50 parts by weight. The content of the anti-settling agent (e6), with respect to 100% by weight of the antifouling coating composition (containing a solvent), is usually about 0.1 to 20% by weight, preferably about 0.1 to 10% by weight. When the content of the anti-settling agent (e6) is set within these ranges, it is possible to improve the storage stability of the antifouling coating composition; and moreover when the formation of the antifouling coating film is followed by the formation, on such an antifouling coating film, of a coating film (over-coating film) composed of the same kind of coating composition (antifouling coating composition) or different kinds of coating compositions, it is possible to prevent the decrease in the adhesion between the antifouling coating film and the over-coating film (interlayer adhesion, over coating properties).

Dehydrating Agent (e7)

By employing the copolymer (A), which has good storage stability, the antifouling coating composition of the present invention has excellent storage stability, and as needed, may have a dehydrating agent (e7) added therein in order to have further excellent long-term storage stability. The dehydrating agent (e7) is preferably at least one dehydrating agent selected from the group consisting of synthetic zeolite, anhydrous gypsum and gypsum hemihydrate, as an inorganic dehydrating agent; and alkoxysilanes such as tetramethoxysilane, tetraethoxysilane, tetrabutoxysilane, tetraphenoxysilane, methyltriethoxysilane, dimethyldiethoxysilane and trimethylethoxysilane, their condensation products, i.e., polyalkoxysilanes, orthoformic acid alkyl esters such as methyl orthoformate and ethyl orthoformate, as an organic dehydrating agent. The content of these dehydrating agents (e7), with respect to 100 parts by weight of the copolymer (A), is preferably 0.1 to 50 parts by weight.

6. Solvent (F)

The antifouling coating composition of the present invention may comprise a solvent (F) such as water and organic solvents in order to allow the copolymer (A) and the like to have increased dispersibility and to control the viscosity of the composition. As the solvent (F), the antifouling coating composition of the present invention may comprise a solvent employed when preparing the copolymer (A), or a solvent separately added when mixing the copolymer (A) with other optional components.

Examples of the organic solvent include aromatic organic solvents such as xylene, toluene and ethylbenzene; ketones such as methylethylketone, methylisobutylketone and cyclohexanone; aliphatic (the number of carbon atoms: about 1 to 10, preferably about 2 to 5) monovalent alcohols such as ethanol, isopropyl alcohol, n-butanol and isobutanol; ester solvents such as ethyl acetate and butyl acetate.

The content of the solvent (F) in the antifouling coating composition of the present invention, with respect to 100% by weight of the antifouling coating composition, is usually 20 to 80% by weight, preferably 30 to 70% by weight.

[Production Method for Antifouling Coating Composition]

The antifouling coating composition of the present invention may be produced through the appropriate use of a known method. An exemplary method is such that the copolymer (A), and components (B) to (F) as needed are added to a stirring container at a time or in an arbitrary order, and then these components are mixed by known stirring and mixing means to disperse or dissolve the components in a solvent.

As described above, it is preferable that after the copolymer (A) and the like are dispersed or dissolved in a solvent, amide wax (for example, DISPARLON630-20X and the like) is added, and dispersed for example for about 10 to 20 min, to prepare the antifouling coating composition. This is preferable because upon applying the resultant antifouling coating composition on a substrate, the occurrence of sagging can be decreased.

Examples of the stirring and mixing means include a high-speed disperser and a sand-grinding mill, a basket mill, a ball mill, a three-roll mill, a Ross mixer and a planetary mixer and a universal Shinagawa agitator.

[Antifouling Coating Film and Antifouling Substrate]

The antifouling coating film of the present invention is prepared by letting the antifouling coating composition of the present invention dry naturally or subjecting the antifouling coating composition of the present invention to drying means such as a heater, to thereby cure the composition.

The antifouling substrate of the present invention is formed by coating a substrate (target, material to be coated) with the antifouling coating composition of the present invention by coating means such as an air spray, an airless spray, a brush and a roller, or by impregnating a substrate with the antifouling coating composition of the present invention, and subjecting the coating composition, which is used to coat or impregnate the substrate, to, for example, natural drying (temperature of about room temperature) or drying means such as a heater, to dry and cure the composition to thereby form the antifouling coating film on the substrate.

The substrate used herein, which is not particularly limited, is preferably a substrate contacting with seawater or fresh water. Specific examples thereof include underwater structures such as supply and exhaust ports of various power plants (thermal power plants and nuclear power plants), coastal roads, undersea tunnels, harbor facilities, and sludge-diffusion prevention films employed for various ocean/river civil engineering works such as canals and water channels; ships such as FRP ship (particularly, a part of a ship ranging from its waterline part to its ship bottom); and fishing materials such as fishing gear such as rope and fishing nets, floats and buoys.

Examples of materials for these substrates, particularly for ships, are steel, aluminum and wood. Examples of materials for fishing nets are natural or synthetic fibers. Examples of materials for floats and buoys are synthetic resins. The material of the substrate is not particularly limited as long as antifouling properties and the like in water are required for the substrate.

In the case of the surface of these substrates, particularly that of a ship bottom and the like, usually, a steel-made substrate surface is under-coated with a primer such as an anticorrosive coating material to give a primer-treated substrate, and the surface of the primer-treated substrate surface is coated by the method as described above one time or plural times with the antifouling coating composition of the present invention (antifouling paint). Then, the antifouling coating composition used for coating or impregnating (in particular when a substrate is fishing net or the like) is cured to form an antifouling coating film. As a result, the antifouling coating film is provided which is excellent in properties preventing the adherence of aquatic creatures such as sea lettuce, barnacle, green layer, serpula, oyster and bryozoans for a long term (antifouling properties, particularly static antifouling properties); and particularly when the antifouling coating film contains an antifouling component (for example, copper or copper compounds (component C), organic antifouling agents (component D)), the antifouling component can be gradually released over a long period of time.

When the substrate is a ship (particularly its bottom), an underwater structure or the like (generally, the substrate surface may be primer-treated or have a layer formed from any of epoxy resins, vinyl resin-based paints, acrylic resin-based paints and urethane resin-based paints), such a substrate surface is coated with the antifouling coating composition plural times (thick-coating: thickness of the film dried: about 100 to 600 μm), and thereby the resultant antifouling substrate exhibits excellent antifouling properties as well as appropriate plasticity and excellent crack resistance with good balance.

Regarding the production of the antifouling substrate, when the substrate is, for example, a steel plate or fishing net with a deteriorated antifouling coating film, the substrate surface may be directly coated with the antifouling coating composition of the present invention, or may be directly impregnated with the antifouling coating composition of the present invention (when the substrate is fishing net or the like). When the substrate is made of a steel, the substrate surface may be previously coated with a base material such as an anticorrosive and a primer to form a base layer, and then the surface of the base layer may be coated with the coating composition of the present invention. For the purpose of repairing, the antifouling coating film of the present invention may further be formed on the surface of a substrate on which the antifouling coating film of the present invention or a conventional antifouling coating film has been formed.

The thickness of the antifouling coating film, which is not particularly limited, is for example about 30 to 250 μm per coating operation when the substrate is a ship or an underwater structure.

As described above, the underwater structure having the antifouling coating film of the present invention can prevent aquatic creatures from adhering thereto over a long period of time, and as a result thereof, the underwater structure can maintain its functions over a long period of time. The fishing net having the antifouling coating film of the present invention has less possibility of environmental pollution, and is prevented from clogging as a result of the prevention of the adherence of aquatic creatures.

EXAMPLES

Hereinafter, with reference to Examples, the present invention is further specifically described, but the present invention is limited in no way with these Examples. In the section of "Example", "%" denotes "% by weight" unless otherwise noted.

Production Example A1

A reaction vessel equipped with a stirring device, a reflux condenser, a thermometer, a nitrogen-introducing tube and a dropping funnel was charged with xylene in an amount of 53 parts. Under nitrogen atmosphere, while xylene was stirred with the stirring device, under an atmospheric pressure, the reaction vessel was heated until the temperature of xylene in the reaction vessel reached 85° C. While keeping the temperature of xylene in the reaction vessel at 85° C., a monomer mixture composed of 75 parts by weight of TIPSMA (triisopropylsilyl methacrylate), 5 parts by weight of TIPSA (triisopropylsilyl acrylate), 10 parts by weight of EA (ethyl acrylate), 10 parts by weight of MMA (methyl methacrylate) and 1 part by weight of AMBN (2,2'-azobis (2-methylbutyronitrile)) was added into the reaction vessel with the dropping funnel over a period of 2 hours.

Subsequently, 0.5 parts by weight of t-butylperoxyoctoate was further added to the reaction vessel. Under atmospheric pressure, while the liquid temperature in the reaction vessel was kept at 85° C., stirring was performed for 2 hours with the stirring device. Then, the liquid temperature in the reaction vessel was raised from 85° C. to 110° C., and heating was performed for 1 hour. Thereafter, into the reaction vessel, 14 parts by weight of xylene was added and the liquid temperature in the reaction vessel was lowered. When the liquid temperature reached 40° C., stirring was stopped. Thereby, a copolymer solution (A1) containing a silyl(meth)acrylate copolymer (polymer (A)) was prepared.

In accordance with test conditions in "Evaluation of properties of (co)polymer solution and (co)polymer" described later, the heat residue content (% by weight) of the resultant copolymer solution (A1) was calculated, and the weight average molecular weight (Mw) of the polymer contained in the solution was measured (Results are set forth in Table 1).

TABLE 1

| | Resin Production Example | | A1 | A2 | A3 | A4 | A5 | A6 | A7 | A8 |
|---|---|---|---|---|---|---|---|---|---|---|
| | Polymer Solution | | A1 | A2 | A3 | A4 | A5 | A6 | A7 | A8 |
| Monomer mixture | (i) | TIPSMA(part by weight) | 75 | 70 | 60 | 50 | 50 | 45 | 42 | 60 |
| | (ii) | TIPSA(part by weight) | 5 | 10 | 20 | 30 | 30 | 35 | 38 | 10 |
| | (iii) | EA(part by weight) | 10 | 10 | 10 | 10 | 0 | 10 | 10 | 10 |
| | | MMA(part by weight) | 10 | 10 | 10 | 10 | 10 | 10 | 10 | 20 |
| | | BA(part by weight) | | | | | 10 | | | |
| | Reaction Initiator | AMBN(part by weight) | 1 | 1 | 1 | 1 | 1 | 1 | 1 | 1.2 |
| Reaction Initiator | | t-butylperoxyoctoate (part by weight) | 0.5 | 0.5 | 0.5 | 0.5 | 0.5 | 0.5 | 0.5 | 0.5 |
| Properties Evaluation | Percentage of heat residue in polymer solution (wt %) | | 59.5 | 59.7 | 59.8 | 59.6 | 59.3 | 59.4 | 59.7 | 59.3 |
| | Weight average molecular weight Mw | | 31,151 | 32,404 | 30,228 | 28,507 | 31,293 | 30,334 | 31,383 | 31,975 |
| | Viscosity of Polymer solution (mPa · s) | | 1,108 | 1,027 | 793 | 618 | 721 | 586 | 566 | 1,566 |
| | (i)/(ii) (weight ratio) *1 | | 93.8 | 87.5 | 75.0 | 62.5 | 62.5 | 56.3 | 52.5 | 85.7 |
| | | | 6.3 | 12.5 | 25.0 | 37.5 | 37.5 | 43.8 | 47.5 | 14.3 |
| | ((i) + (ii)) content (wt %) *2 | | 80 | 80 | 80 | 80 | 80 | 80 | 80 | 70 |

| | Resin Production Example | | A9 | A10 | A11 | A12 | A13 | A14 | A15 | A16 |
|---|---|---|---|---|---|---|---|---|---|---|
| | Polymer Solution | | A9 | A10 | A11 | A12 | A13 | A14 | A15 | A16 |
| Monomer mixture | (i) | TIPSMA(part by weight) | 50 | 40 | 37 | 55 | 50 | 40 | 35 | 32 |
| | (ii) | TIPSA(part by weight) | 20 | 30 | 33 | 5 | 10 | 20 | 25 | 28 |

TABLE 1-continued

|  |  |  |  |  |  |  |  |  |  |
|---|---|---|---|---|---|---|---|---|---|
|  | (iii) | EA(part by weight) | 10 | 10 | 10 | 10 | 10 | 10 | 10 | 10 |
|  |  | MMA(part by weight) | 20 | 20 | 20 | 30 | 30 | 30 | 30 | 10 |
|  |  | BA(part by weight) |  |  |  |  |  |  |  |  |
|  | Reaction Initiator | AMBN(part by weight) | 1.2 | 1.2 | 1.2 | 1.3 | 1.4 | 1.4 | 1.4 | 1.4 |
| Reaction Initiator |  | t-butylperoxyoctoate (part by weight) | 0.5 | 0.5 | 0.5 | 0.5 | 0.5 | 0.5 | 0.5 | 0.5 |
| Properties Evaluation | Percentage of heat residue in polymer solution (wt %) |  | 59.5 | 59.7 | 60.1 | 59.8 | 59.4 | 59.5 | 59.8 | 59.7 |
|  | Weight average molecular weight Mw |  | 32,741 | 27,770 | 30,333 | 30,251 | 29,766 | 31,561 | 30,012 | 28,321 |
|  | Viscosity of Polymer solution (mPa · s) |  | 1,347 | 1,112 | 1,099 | 2,335 | 2,238 | 1,952 | 1,888 | 1,733 |
|  | (i)/((ii) (weight ratio) *1 |  | 71.4 | 57.1 | 52.86 | 91.7 | 83.3 | 66.7 | 58.3 | 53.33 |
|  |  |  | 28.6 | 42.9 | 47.14 | 8.3 | 16.7 | 33.3 | 41.7 | 46.67 |
|  | ((i) + (ii)) content (wt %) *2 |  | 70 | 70 | 70 | 60 | 60 | 60 | 60 | 60 |

$$*1\ (i)/(ii) = \frac{\text{Amount of charge of (i)}}{\text{Amount of charge of (ii)}}$$

$$*2\ ((i)/(ii))\ \text{Content (wt \%)} = \frac{\text{Amount of charge of (ii)}}{\text{Amoung of charge of (i)} + \text{Amount of charge of (ii)} + \text{Amount of charge of (iii)}} \times 100$$

Production Examples A2 to A16 and Production Examples B1 to B7

The same procedure as in Production Example A1 was performed except that a monomer mixture having a formulation shown in Table 1 or Table 2 was used instead of the monomer mixture used in Production Example A1. Thereby, a silyl(meth)acrylate (co)polymer solution (A1) containing a silyl(meth)acrylate copolymer (polymer (A)) was prepared, and its heat residue was calculated, and the weight average molecular weight (Mw) of the (co)polymer was measured.

In Tables 1 to 4, (co)polymer solutions A2 to A16 and (co)polymer solutions B1 to B7 refer to solutions containing (co)polymers obtained in Production Examples A2 to A16 and Production Examples B1 to B7, respectively.

TABLE 2

| Resin Production Example |  |  | B1 | B2 | B3 | B4 | B5 | B6 | B7 |
|---|---|---|---|---|---|---|---|---|---|
| Polymer Solution |  |  | B1 | B2 | B3 | B4 | B5 | B6 | B7 |
| Monomer mixture | (i) | TIPSMA(part by weight) | 70 |  | 35 | 20 | 10 | 20 | 30 |
|  | (ii) | TIPSA(part by weight) |  | 70 | 35 | 50 | 60 | 40 | 50 |
|  | (iii) | EA(part by weight) | 10 | 10 | 10 | 10 | 10 | 10 | 10 |
|  |  | MMA(part by weight) | 20 | 20 | 20 | 20 | 20 | 30 | 10 |
|  |  | BA(part by weight) |  |  |  |  |  |  |  |
|  | Reaction Initiator | AMBN(part by weight) | 1 | 1.2 | 1.2 | 1 | 1 | 1.4 | 0.7 |
| Reaction Initiator |  | t-butylperoxyoctoate (part by weight) | 0.5 | 0.5 | 0.5 | 0.5 | 0.5 | 0.5 | 0.5 |
| Properties Evaluation | Percentage of heat residue in polymer solution (wt %) |  | 59.8 | 60.4 | 59.8 | 60.2 | 60.6 | 59.1 | 60.9 |
|  | Weight average molecular weight Mw |  | 29,223 | 28,578 | 28,921 | 30,002 | 29,256 | 29,506 | 27,774 |
|  | Viscosity of Polymer solution (mPa · s) |  | 1,924 | 484 | 992 | 808 | 563 | 1,254 | 561 |
|  | (i)/(ii) (weight ratio) *1 |  | 100.0 | 0.0 | 50.0 | 28.6 | 14.3 | 33.3 | 37.5 |
|  |  |  | 0.0 | 100.0 | 50.0 | 71.4 | 85.7 | 66.7 | 62.5 |
|  | ((i) + (ii)) content (wt %) *2 |  | 70 | 70 | 70 | 70 | 70 | 60 | 80 |

Example 1

Preparation of Antifouling Coating Composition

A plastic container (volume: 1000 ml) was charged with xylene in an amount of 18.2 parts by weight as a solvent, and trimethyl isobutenyl cyclohexene carboxylic acid (50% xylene solution) as the component B in an amount of 4.0 parts by weight. These components were mixed with a paint shaker until trimethyl isobutenyl cyclohexene carboxylic acid became uniformly dissolved in xylene.

Subsequently, to the plastic container, the polymer solution A1 in an amount of 18 parts by weight was added and mixed with a paint shaker until uniformly dispersed or dissolved. Thereafter, to the plastic container, additives (1) (3.0 parts by weight of talc FC-1, 4.0 parts by weight of zinc oxide (zinc oxide No. 3), 45 parts by weight of cuprous oxide NC301, 0.3 part by weight of Novoperm Red F5RK, 2.0 parts by weight of titanium white R-5N, 1.0 part by weight of copper omadine (copper pyrithione) and 2.0 parts by weight of DISPARLON 4200-20X) were added and stirred with a paint shaker for 1 hour to disperse these components.

After dispersing, 2.5 parts by weight of DISPARLON 630-20X was added and stirred for 20 minutes with a paint shaker. Then, the mixture was filtered with a filtering net (opening: 80 mesh), and the residue was removed to obtain a filtered material (coating composition A1). Manufacturers and the like of the above various additives are set forth in Table 8.

Using the resultant coating composition, in accordance with test conditions described in "Evaluation of coating material properties", various properties were evaluated. Results are set forth in Table 5.

Examples 2 to 24 and Comparative Examples 1 to 9

The same procedure was performed as in Example 1 except that the solvent, the polymer solution, the component B and the additives (1) that were used in Example 1 were changed as shown in Tables 3 and 4, to prepare a coating composition, and various coating material properties were evaluated. Results are set forth in Tables 5 and 6.

The coating compositions A2 to A24 and the coating compositions B1 to B9 that are shown in Table 5 and 6 are the coating compositions obtained in Examples 2 to 24 and Comparative Examples 1 to 9, respectively.

TABLE 3

|  |  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|---|
| Coating Composition |  | A1 | A2 | A3 | A4 | A5 | A6 | A7 | A8 | A9 | A10 | A11 | A12 |
| Polymer Solution | A1 | 18 |  |  |  |  |  |  |  |  |  |  |  |
|  | A2 |  | 18 |  |  |  |  |  |  |  |  |  |  |
|  | A3 |  |  | 18 | 18 | 16 |  |  |  |  |  |  |  |
|  | A4 |  |  |  |  |  | 18 | 18 | 16 | 18 | 18 | 16 | 16 |
|  | A5 |  |  |  |  |  |  |  |  |  |  |  |  |
|  | A6 |  |  |  |  |  |  |  |  |  |  |  |  |
|  | A7 |  |  |  |  |  |  |  |  |  |  |  |  |
|  | A8 |  |  |  |  |  |  |  |  |  |  |  |  |
|  | A9 |  |  |  |  |  |  |  |  |  |  |  |  |
|  | A10 |  |  |  |  |  |  |  |  |  |  |  |  |
|  | A11 |  |  |  |  |  |  |  |  |  |  |  |  |
|  | A12 |  |  |  |  |  |  |  |  |  |  |  |  |
|  | A13 |  |  |  |  |  |  |  |  |  |  |  |  |
|  | A14 |  |  |  |  |  |  |  |  |  |  |  |  |
|  | A15 |  |  |  |  |  |  |  |  |  |  |  |  |
|  | A16 |  |  |  |  |  |  |  |  |  |  |  |  |
| Component B | Trimethylisobutenyl cyclohexenecarboxylic acid (50% xylene solution) | 4 | 4 | 4 |  |  | 4 | 4 | 7 |  |  |  |  |
|  | Versatic acid |  |  |  |  |  |  |  |  | 2 |  |  |  |
|  | Rosin |  |  |  | 2 | 3.5 |  |  |  |  | 2 | 3.5 | 3.5 |
| Other Additives | Zinc oxide No. 3 | 4 | 4 | 4 | 4 | 4 | 4 | 4 | 4 | 4 | 4 | 4 | 4 |
|  | Naphthol Red F5RK | 0.3 | 0.3 | 0.3 | 0.3 | 0.3 | 0.3 | 0.3 | 0.3 | 0.3 | 0.3 | 0.3 | 0.3 |
|  | Titanium white R-5N | 2 | 2 | 2 | 2 | 2 | 2 | 2 | 2 | 2 | 2 | 2 | 2 |
|  | Disparlon 4200-20X | 2 | 2 | 2 | 2 | 2 | 2 | 2 | 2 | 2 | 2 | 2 | 2 |
|  | Talc FC-1 | 3 | 3 | 3 | 3 | 3 | 3 | 3 | 3 | 3 | 3 | 3 | 3 |
|  | Copper pyrithione | 1 | 1 | 1 | 1 | 1 | 1 | 1 | 1 | 1 | 1 | 1 | 1 |
|  | Cuprous oxide NC301 | 45 | 45 | 45 | 45 | 45 | 45 | 45 | 45 | 45 | 45 | 45 | 45 |
|  | 4,5-dichloro-2-n-octyl-4-isothiazoline-3-one |  |  |  |  |  |  | 5 |  |  |  |  | 5 |
| Xylene |  | 18.2 | 18.2 | 18.2 | 20.2 | 20.7 | 18.2 | 13.2 | 17.2 | 20.2 | 20.2 | 20.7 | 15.7 |
| Disparlon A630-20X |  | 2.5 | 2.5 | 2.5 | 2.5 | 2.5 | 2.5 | 2.5 | 2.5 | 2.5 | 2.5 | 2.5 | 2.5 |
| Total |  | 100 | 100 | 100 | 100 | 100 | 100 | 100 | 100 | 100 | 100 | 100 | 100 |

|  |  | Ex. 13 | Ex. 14 | Ex. 15 | Ex. 16 | Ex. 17 | Ex. 18 | Ex. 19 | Ex. 20 | Ex. 21 | Ex. 22 | Ex. 23 | Ex. 24 |
|---|---|---|---|---|---|---|---|---|---|---|---|---|---|
| Coating Composition |  | A13 | A14 | A15 | A16 | A17 | A18 | A19 | A20 | A21 | A22 | A23 | A24 |
| Polymer Solution | A1 |  |  |  |  |  |  |  |  |  |  |  |  |
|  | A2 |  |  |  |  |  |  |  |  |  |  |  |  |
|  | A3 |  |  |  |  |  |  |  |  |  |  |  |  |
|  | A4 |  |  |  |  |  |  |  |  |  |  |  |  |
|  | A5 | 18 |  |  |  |  |  |  |  |  |  |  |  |
|  | A6 |  | 18 |  |  |  |  |  |  |  |  |  |  |
|  | A7 |  |  | 18 |  |  |  |  |  |  |  |  |  |
|  | A8 |  |  |  | 18 |  |  |  |  |  |  |  |  |
|  | A9 |  |  |  |  | 18 |  |  |  |  |  |  |  |
|  | A10 |  |  |  |  |  | 18 |  |  |  |  |  |  |
|  | A11 |  |  |  |  |  |  | 18 |  |  |  |  |  |
|  | A12 |  |  |  |  |  |  |  | 18 |  |  |  |  |
|  | A13 |  |  |  |  |  |  |  |  | 18 |  |  |  |
|  | A14 |  |  |  |  |  |  |  |  |  | 18 |  |  |
|  | A15 |  |  |  |  |  |  |  |  |  |  | 18 |  |
|  | A16 |  |  |  |  |  |  |  |  |  |  |  | 18 |
| Component B | Trimethylisobutenyl cyclohexenecarboxylic acid (50% xylene solution) | 4 | 4 | 4 | 4 | 4 | 4 | 4 | 4 | 4 | 4 | 4 | 4 |
|  | Versatic acid |  |  |  |  |  |  |  |  |  |  |  |  |
|  | Rosin |  |  |  |  |  |  |  |  |  |  |  |  |
| Other Additives | Zinc oxide No. 3 | 4 | 4 | 4 | 4 | 4 | 4 | 4 | 4 | 4 | 4 | 4 | 4 |
|  | Naphthol Red F5RK | 0.3 | 0.3 | 0.3 | 0.3 | 0.3 | 0.3 | 0.3 | 0.3 | 0.3 | 0.3 | 0.3 | 0.3 |
|  | Titanium white R-5N | 2 | 2 | 2 | 2 | 2 | 2 | 2 | 2 | 2 | 2 | 2 | 2 |
|  | Disparlon 4200-20X | 2 | 2 | 2 | 2 | 2 | 2 | 2 | 2 | 2 | 2 | 2 | 2 |

TABLE 3-continued

|  |  |  |  |  |  |  |  |  |  |  |  |  |
|---|---|---|---|---|---|---|---|---|---|---|---|---|
| Talc FC-1 | 3 | 3 | 3 | 3 | 3 | 3 | 3 | 3 | 3 | 3 | 3 | 3 |
| Copper pyrithione | 1 | 1 | 1 | 1 | 1 | 1 | 1 | 1 | 1 | 1 | 1 | 1 |
| Cuprous oxide NC301 | 45 | 45 | 45 | 45 | 45 | 45 | 45 | 45 | 45 | 45 | 45 | 45 |
| 4,5-dichloro-2-n-octyl-4-isothiazoline-3-one |  |  |  |  |  |  |  |  |  |  |  |  |
| Xylene | 18.2 | 18.2 | 18.2 | 18.2 | 18.2 | 18.2 | 18.2 | 18.2 | 18.2 | 18.2 | 18.2 | 18.2 |
| Disparlon A630-20X | 2.5 | 2.5 | 2.5 | 2.5 | 2.5 | 2.5 | 2.5 | 2.5 | 2.5 | 2.5 | 2.5 | 2.5 |
| Total | 100 | 100 | 100 | 100 | 100 | 100 | 100 | 100 | 100 | 100 | 100 | 100 |

TABLE 4

|  |  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 |
|---|---|---|---|---|---|---|---|---|---|---|
|  | Coating Composition | B1 | B2 | B3 | B4 | B5 | B6 | B7 | B8 | B9 |
| Polymer Solution | B1 | 18 |  |  |  |  |  |  |  | 9 |
|  | B2 |  | 18 |  |  |  |  |  |  | 9 |
|  | B3 |  |  | 18 |  |  |  |  |  |  |
|  | B4 |  |  |  | 18 |  |  |  |  |  |
|  | B5 |  |  |  |  | 18 |  |  |  |  |
|  | B6 |  |  |  |  |  | 18 | 18 |  |  |
|  | B7 |  |  |  |  |  |  |  | 18 |  |
| Component B | Trimethylisobutenyl cyclohexenecarboxylic acid (50% xylene solution) | 4 | 4 | 4 | 4 | 4 |  |  | 4 | 4 |
|  | Versatic acid |  |  |  |  |  | 2 |  |  |  |
|  | Rosin |  |  |  |  |  |  | 2 |  |  |
| Other Additives | Zinc oxide No. 3 | 4 | 4 | 4 | 4 | 4 | 4 | 4 | 4 | 4 |
|  | Naphthol Red F5RK | 0.3 | 0.3 | 0.3 | 0.3 | 0.3 | 0.3 | 0.3 | 0.3 | 0.3 |
|  | Titanium white R-5N | 2 | 2 | 2 | 2 | 2 | 2 | 2 | 2 | 2 |
|  | Disparlon 4200-20X | 2 | 2 | 2 | 2 | 2 | 2 | 2 | 2 | 2 |
|  | Talc FC-1 | 3 | 3 | 3 | 3 | 3 | 3 | 3 | 3 | 3 |
|  | Copper pyrithione | 1 | 1 | 1 | 1 | 1 | 1 | 1 | 1 | 1 |
|  | Cuprous oxide NC301 | 45 | 45 | 45 | 45 | 45 | 45 | 45 | 45 | 45 |
|  | 4,5-dichloro-2-n-octyl-4-isothiazoline-3-one |  |  |  |  | 5 | 5 | 5 | 5 |  |
| Xylene |  | 18.2 | 18.2 | 18.2 | 18.2 | 13.2 | 15.2 | 15.2 | 13.2 | 18.2 |
| Disparlon A630-20X |  | 2.5 | 2.5 | 2.5 | 2.5 | 2.5 | 2.5 | 2.5 | 2.5 | 2.5 |
| Total |  | 100 | 100 | 100 | 100 | 100 | 100 | 100 | 100 | 100 |

TABLE 5

|  |  | Example | 1 | 2 | 3 | 4 | 5 | 6 | 7 | 8 | 9 | 10 | 11 | 12 |
|---|---|---|---|---|---|---|---|---|---|---|---|---|---|---|
|  |  | Coating Composition | A1 | A2 | A3 | A4 | A5 | A6 | A7 | A8 | A9 | A10 | A11 | A12 |
| Coating film deterioration acceleration test | Immersion period | 1 month Appearance (crack) | 0 | 0 | 0 | 0 | 0 | 0 | 0 | 0 | 0 | 0 | 0 | 0 |
|  |  | Adhesion | 0 | 0 | 0 | 0 | 0 | 0 | 0 | 0 | 0 | 0 | 0 | 0 |
|  |  | 2 months Appearance (crack) | 0 | 0 | 0 | 0 | 0 | 0 | 0 | 0 | 0 | 0 | 0 | 0 |
|  |  | Adhesion | 0 | 0 | 0 | 0 | 0 | 0 | 0 | 0 | 0 | 0 | 0 | 0 |
|  |  | 3 months Appearance (crack) | 0 | 0 | 0 | 0 | 0 | 0 | 0 | 0 | 0 | 0 | 0 | 0 |
|  |  | Adhesion | 0 | 0 | 0 | 0 | 0 | 0 | 0 | 0 | 0 | 0 | 0 | 0 |
|  |  | 4 months Appearance (crack) | 0 | 0 | 0 | 0 | 0 | 0 | 0 | 0 | 0 | 0 | 0 | 0 |
|  |  | Adhesion | 0 | 0 | 0 | 0 | 0 | 0 | 0 | 0 | 0 | 0 | 0 | 0 |
|  |  | 5 months Appearance (crack) | 0 | 0 | 0 | 0 | 0 | 0 | 0 | 0 | 0 | 0 | 0 | 0 |
|  |  | Adhesion | 0 | 0 | 0 | 0 | 0 | 0 | 0 | 0 | 0 | 0 | 0 | 0 |
| Coating film consumption property test | Immersion period | 1 month | 2.1 | 3.3 | 4.1 | 3.7 | 5.7 | 3.7 | 3.7 | 4.5 | 4 | 4.2 | 5.9 | 6.1 |
|  |  | 2 months | 3.6 | 4 | 5.1 | 5.9 | 9.8 | 5.7 | 5.5 | 8.9 | 7 | 7.7 | 9.9 | 10.4 |
|  |  | 3 months | 4.5 | 5.3 | 5.9 | 7.9 | 14.3 | 6.8 | 7.5 | 13.3 | 8.3 | 9.8 | 14.7 | 15.7 |
|  |  | 4 months | 5.1 | 7 | 9.1 | 10.3 | 19.7 | 9.8 | 9.9 | 18.9 | 10.8 | 12.3 | 19.7 | 21.3 |
|  |  | 5 months | 7 | 10.3 | 13.5 | 14.2 | 25.7 | 14 | 13.3 | 24.5 | 14.2 | 15.7 | 24.8 | 26.7 |
|  |  | 6 months | 8.6 | 13.7 | 18.3 | 18.5 | 30.5 | 19.7 | 18.3 | 29.8 | 17.9 | 20.2 | 29.8 | 33.5 |
|  |  | 7 months | 11.4 | 15.7 | 22.3 | 23.5 | 36.7 | 23 | 22.1 | 35.6 | 23.5 | 24.5 | 36.6 | 40.9 |
|  |  | 8 months | 13.9 | 18.7 | 26.7 | 28.7 | 42.3 | 27.5 | 26.3 | 40.3 | 28.6 | 29.8 | 42.3 | 46.8 |
|  |  | 9 months | 16.5 | 22.3 | 31.5 | 34.5 | 48.9 | 32.5 | 29.5 | 46.5 | 33.9 | 35.7 | 47.8 | 53.2 |
|  |  | 10 months | 22.3 | 28.3 | 36.7 | 39.8 | 55.8 | 37.8 | 35.7 | 52.3 | 39.9 | 40.1 | 53.1 | 59.8 |
|  |  | 11 months | 25 | 36.9 | 40.8 | 44.3 | 61.3 | 42.1 | 44.5 | 59.8 | 47.3 | 45.6 | 59.9 | 65.8 |
|  |  | 12 months | 27.3 | 42.4 | 46.3 | 49.8 | 68.8 | 48.9 | 51.8 | 67.8 | 53.2 | 50.8 | 66.5 | 72.3 |
|  | Monthly average coating film consumption amount (μm) |  | 2.3 | 3.5 | 3.9 | 4.2 | 5.7 | 4.1 | 4.3 | 5.7 | 4.4 | 4.2 | 5.5 | 6.0 |
|  | Coating film appearance of after 12 months |  | AA | AA | AA | AA | AA | AA | AA | AA | AA | AA | AA | AA |
| Static antifouling property test | Immersion period | 1 month | 0 | 0 | 0 | 0 | 0 | 0 | 0 | 0 | 0 | 0 | 0 | 0 |
|  |  | 2 months | 0 | 0 | 0 | 0 | 0 | 0 | 0 | 0 | 0 | 0 | 0 | 0 |
|  |  | 3 months | 0.5 | 0 | 0 | 0 | 0 | 0 | 0 | 0 | 0 | 0 | 0 | 0 |

TABLE 5-continued

| | | | | | | | | | | | | | | |
|---|---|---|---|---|---|---|---|---|---|---|---|---|---|---|
| | | 4 months | | 0.5 | 0 | 0 | 0 | 0 | 0 | 0 | 0 | 0 | 0 | 0 | 0 |
| | | 5 months | | 0.5 | 0.5 | 0 | 0 | 0 | 0 | 0 | 0 | 0 | 0 | 0 | 0 |
| | | 6 months | | 0.5 | 0.5 | 0 | 0.5 | 0 | 0 | 0 | 0.5 | 0 | 0.5 | 0 | 0 |
| Storage stability test | Initial viscosity (Ku) | | | 86 | 85 | 82 | 84 | 81 | 84 | 85 | 83 | 82 | 86 | 83 | 81 |
| | Viscosity after storage at 50° C. for 3 months | | | 87 | 86 | 83 | 85 | 83 | 86 | 87 | 86 | 86 | 86 | 84 | 83 |
| | Increase of viscosity (Ku) | | | +1 | +1 | +1 | +1 | +2 | +2 | +2 | +3 | +4 | 0 | +1 | +2 |

| | | Example | | 13 | 14 | 15 | 16 | 17 | 18 | 19 | 20 | 21 | 22 | 23 | 24 |
|---|---|---|---|---|---|---|---|---|---|---|---|---|---|---|---|
| | | Coating Composition | | A13 | A14 | A15 | A16 | A17 | A18 | A19 | A20 | A21 | A22 | A23 | A24 |
| Coating film deterioration acceleration test | Immersion period | 1 month | Appearance (crack) | 0 | 0 | 0 | 0 | 0 | 0 | 0 | 0 | 0 | 0 | 0 | 0 |
| | | | Adhesion | 0 | 0 | 0 | 0 | 0 | 0 | 0 | 0 | 0 | 0 | 0 | 0 |
| | | 2 months | Appearance (crack) | 0 | 0 | 0 | 0 | 0 | 0 | 0 | 0 | 0 | 0 | 0 | 0 |
| | | | Adhesion | 0 | 0 | 0 | 0 | 0 | 0 | 0 | 0 | 0 | 0 | 0 | 0 |
| | | 3 months | Appearance (crack) | 0 | 0 | 0 | 0 | 0 | 0 | 1 | 0 | 0 | 0 | 0 | 1 |
| | | | Adhesion | 0 | 0 | 0 | 0 | 0 | 0 | 1 | 0 | 0 | 0 | 0 | 1 |
| | | 4 months | Appearance (crack) | 0 | 0 | 1 | 0 | 0 | 0 | 1 | 0 | 0 | 0 | 0 | 1 |
| | | | Adhesion | 0 | 0 | 1 | 0 | 0 | 0 | 1 | 0 | 0 | 0 | 0 | 1 |
| | | 5 months | Appearance (crack) | 0 | 0 | 1 | 0 | 0 | 0 | 1 | 0 | 0 | 0 | 0 | 1 |
| | | | Adhesion | 0 | 0 | 1 | 0 | 0 | 0 | 1 | 0 | 0 | 0 | 0 | 1 |
| Coating film consumption property test | Immersion period | 1 month | | 2.5 | 4.5 | 4.7 | 3.2 | 3.1 | 3.5 | 3.7 | 1.2 | 1.2 | 1.4 | 1.8 | 2 |
| | | 2 months | | 3.8 | 6.9 | 7.1 | 3.9 | 3.9 | 4.1 | 4.5 | 3.5 | 3.6 | 3.6 | 4 | 3.9 |
| | | 3 months | | 5.1 | 10.1 | 10.5 | 5.1 | 5.5 | 5.6 | 5.8 | 4.2 | 4.5 | 4.9 | 5.2 | 5.5 |
| | | 4 months | | 7.8 | 13.7 | 14.1 | 7.3 | 7.6 | 8 | 9.1 | 4.9 | 5.1 | 5.3 | 7.4 | 7.8 |
| | | 5 months | | 11.1 | 16.9 | 17.5 | 9.9 | 10.6 | 10.9 | 11.3 | 6.7 | 6.8 | 7 | 8.8 | 9.2 |
| | | 6 months | | 14.6 | 21.2 | 24.9 | 11 | 12.3 | 13.1 | 13.8 | 8.3 | 8.7 | 9.5 | 9.9 | 10.5 |
| | | 7 months | | 18.2 | 26.3 | 30.1 | 15.5 | 17.2 | 18.8 | 19.3 | 10.9 | 11.3 | 12.1 | 13.8 | 13.9 |
| | | 8 months | | 22.4 | 30.9 | 33.5 | 18.4 | 19.8 | 20.5 | 21 | 13.5 | 13.7 | 14.3 | 15.8 | 16.6 |
| | | 9 months | | 26.8 | 34.2 | 38.9 | 22 | 23.6 | 24.6 | 26.6 | 15.9 | 16.3 | 17.4 | 18.3 | 19.1 |
| | | 10 months | | 30.3 | 38.3 | 43.3 | 27.9 | 28.8 | 30 | 32.8 | 20.1 | 20.4 | 22 | 23.1 | 24.8 |
| | | 11 months | | 36.3 | 45.8 | 50.3 | 34.8 | 35.5 | 36.9 | 38.6 | 22.6 | 22.9 | 24.8 | 26.9 | 28.5 |
| | | 12 months | | 44.1 | 54.5 | 56.3 | 40.7 | 42.1 | 44.3 | 46.3 | 24.9 | 25.3 | 27.5 | 28.9 | 30 |
| | Monthly average coating film consumption amount (μm) | | | 3.7 | 4.5 | 4.7 | 3.4 | 3.5 | 3.7 | 3.9 | 2.1 | 2.1 | 2.3 | 2.4 | 2.5 |
| | Coating film appearance of after 12 months | | | AA | AA | AA | AA | AA | AA | AA | AA | AA | AA | AA | AA |
| Static antifouling property test | Immersion period | 1 month | | 0 | 0 | 0 | 0 | 0 | 0 | 0 | 0 | 0 | 0 | 0 | 0 |
| | | 2 months | | 0 | 0 | 0 | 0 | 0 | 0 | 0 | 0 | 0 | 0 | 0 | 0 |
| | | 3 months | | 0 | 0 | 0 | 0 | 0 | 0 | 0 | 0.5 | 0.5 | 0 | 0 | 0 |
| | | 4 months | | 0 | 0 | 0 | 0.5 | 0 | 0 | 0 | 0.5 | 0.5 | 0.5 | 0 | 0 |
| | | 5 months | | 0.5 | 0 | 0 | 0.5 | 0.5 | 0 | 0 | 0.5 | 0.5 | 0.5 | 0.5 | 0.5 |
| | | 6 months | | 0.5 | 0 | 0 | 0.5 | 0.5 | 0 | 0 | 0.5 | 0.5 | 0.5 | 0.5 | 0.5 |
| Storage stability test | Initial viscosity (Ku) | | | 81 | 83 | 83 | 83 | 83 | 82 | 81 | 84 | 85 | 86 | 86 | 81 |
| | Viscosity after storage at 50° C. for 3 months | | | 85 | 89 | 93 | 84 | 87 | 90 | 98 | 85 | 86 | 88 | 92 | 98 |
| | Increase of viscosity (Ku) | | | +4 | +6 | +10 | +1 | +4 | +8 | +17 | +1 | +1 | +2 | +6 | +17 |

TABLE 6

| | | Comparative Example | | 1 | 2 | 3 | 4 | 5 | 6 | 7 | 8 | 9 |
|---|---|---|---|---|---|---|---|---|---|---|---|---|
| | | Coating Composition | | B1 | B2 | B3 | B4 | B5 | B6 | B7 | B8 | B9 |
| Coating film deterioration acceleration test | Immersion period | 1 month | Appearance (crack) | 3 | 0 | 0 | 0 | 0 | 0 | 0 | 0 | 0 |
| | | | Adhesion | 2 | 0 | 0 | 0 | 0 | 0 | 0 | 0 | 0 |
| | | 2 months | Appearance (crack) | 3 | 0 | 0 | 0 | 2 | 0 | 0 | 0 | 0 |
| | | | Adhesion | 2 | 0 | 0 | 0 | 2 | 0 | 0 | 0 | 0 |
| | | 3 months | Appearance (crack) | 3 | 3 | 1 | 2 | 2 | 3 | 0 | 3 | 3 |
| | | | Adhesion | 2 | 2 | 1 | 2 | 2 | 2 | 0 | 2 | 2 |
| | | 4 months | Appearance (crack) | 3 | 3 | 2 | 2 | 2 | 3 | 1 | 3 | 3 |
| | | | Adhesion | 2 | 2 | 2 | 2 | 2 | 2 | 1 | 2 | 2 |
| | | 5 months | Appearance (rack) | 3 | 3 | 3 | 3 | 3 | 3 | 3 | 3 | 3 |
| | | | Adhesion | 2 | 2 | 2 | 2 | 2 | 2 | 2 | 2 | 2 |
| Coating film consumption property test | Immersion period | 1 month | | 1.7 | 5.5 | 3.6 | 4.9 | 5.2 | 2.7 | 3.1 | 2.9 | 3.3 |
| | | 2 months | | 3.2 | 11.3 | 4.3 | 9.3 | 10.3 | 5.5 | 4.9 | 7.5 | 5.7 |
| | | 3 months | | 3.9 | 18.7 | 5.6 | 15 | 16.2 | 10.1 | 8.9 | 11.9 | 8.7 |
| | | 4 months | | 4.7 | 25.3 | 8.2 | 20.9 | 23.1 | 12.7 | 11.3 | 13.8 | 12.3 |
| | | 5 months | | 6.7 | 31.9 | 11 | 29.1 | 29.8 | 18.1 | 15.4 | 18.9 | 15.7 |
| | | 6 months | | 8.3 | 38.7 | 13.9 | 34.1 | 36.4 | 20.7 | 18.9 | 22.2 | 20.5 |
| | | 7 months | | 10.7 | 46 | 19.3 | 40.2 | 44.6 | 26.3 | 23.4 | 27.5 | 24.3 |
| | | 8 months | | 12.3 | 55.3 | 22.1 | 46.9 | 52.7 | 32.3 | 28.8 | 34.1 | 31.6 |
| | | 9 months | | 14.7 | 68.3 | 26 | 55.3 | 64.7 | 38.7 | 34.7 | 40.1 | 36.7 |
| | | 10 months | | 16.7 | 91.8 | 32.3 | 72.5 | 87.5 | 51.2 | 39.8 | 53.2 | 43.5 |
| | | 11 months | | 19.3 | 122.5 | 37.9 | 93.1 | 105.9 | 62.8 | 43.6 | 66.6 | 50.5 |
| | | 12 months | | 22.8 | 151.3 | 47.5 | 118.5 | 129.5 | 83.2 | 49.7 | 85.8 | 58.9 |
| | Monthly average coating film consumption amount (μm) | | | 1.9 | 12.6 | 4.0 | 9.9 | 10.8 | 6.9 | 4.1 | 7.2 | 4.9 |

TABLE 6-continued

| | Comparative Example | | 1 | 2 | 3 | 4 | 5 | 6 | 7 | 8 | 9 |
|---|---|---|---|---|---|---|---|---|---|---|---|
| | Coating film appearance of after 12 months | | Cracking | Cracking | Cracking | Cracking | Cracking | Cracking | Cracking | Cracking | Cracking |
| Static antifouling property test | Immersion period | 1 month | 0 | 0 | 0 | 0 | 0 | 0 | 0 | 0 | 0 |
| | | 2 months | 0.5 | 0 | 0 | 0 | 0 | 0 | 0 | 0 | 0 |
| | | 3 months | 0.5 | 0.5 | 0 | 0 | 0 | 0 | 0 | 0 | 0.5 |
| | | 4 months | 1 | 0.5 | 0 | 0 | 0 | 0.5 | 0 | 0.5 | 0.5 |
| | | 5 months | 2 | 0.5 | 0 | 0 | 0.5 | 0.5 | 0.5 | 0.5 | 0.5 |
| | | 6 months | 3 | 0.5 | 0.5 | 0 | 0.5 | 0.5 | 0.5 | 0.5 | 0.5 |
| Storage stability test | Initial viscosity (Ku) | | 87 | 82 | 82 | 81 | 84 | 83 | 84 | 83 | 84 |
| | Viscosity after storage at 50° C. for 3 months | | 88 | 116 | 110 | 114 | 112 | 113 | 108 | 109 | 113 |
| | Increase of viscosity (Ku) | | +1 | +34 | +28 | +33 | +28 | +30 | +24 | +26 | +29 |

[Evaluation of Properties of (Co)Polymer Solution and (Co)Polymer]
(1) Content of Heat Residue in (Co)Polymer Solution 1.5 g ($X_1$ (g)) of the (co)polymer solution was kept in a thermostat chamber at 1 atmospheric pressure at 108° C. for 3 hours to remove volatile contents, whereby a heat residue (non-volatile contents) was obtained. Subsequently, the amount ($X_2$ (g)) of the resultant heat residue (non-volatile contents) was measured. Based on the following equation, the content (%) of the heat residue contained in the (co)polymer solution was calculated.

Content (%) of heat residue = $X_2/X_1 \times 100$ (2) Average Molecular Weight of (Co)Polymer The weight average molecular weight (Mw) of the (co)polymer was measured by GPC (gel permeation chromatography) under the following conditions.
GPC Conditions
Apparatus: "HLC-8120GPC" (manufactured by Tosoh Corporation)
Column: "SuperH2000+H4000" (manufactured by Tosoh Corporation, 6 mm (inner diameter), 15 cm (length) for each column)
Eluent: tetrahydrofran (THF)
Flow rate: 0.500 ml/min
Detector: RI
Column thermostat chamber temperature: 40° C.
Standard substance: polystyrene
Sample preparation method: to the (co)polymer solution prepared in each Production Example, a small amount of calcium chloride was added to dehydrate the solution, which was followed by filtration with a membrane filter. The obtained filtered material was defined as a sample for GPC measurement.
(3) Viscosity of (Co)Polymer Solution By using an E-type viscometer (manufactured by TOKI SANGYO CO., LTD.), the viscosity (unit: mPa·s) at a liquid temperature 25° C. of the (co)polymer solution was measured.
(4) Coating Film Deterioration Acceleration Test (Evaluation of Coating Film Appearance and Adhesion)

A sandblasted plate (150 mm×70 mm×1.6 mm) was coated by using an applicator with an epoxy-based coating material (epoxy AC coating material, product name: "Bannoh 500", manufactured by Chugoku Marine Paints, Ltd.) such that the thickness of the film dried would be 150 μm, followed by curing, to form a cured coating film (150 μm). Subsequently, the cured coating film was coated by using an applicator with an epoxy binder coating material (product name: "Bannoh 500N", manufactured by Chugoku Marine Paints, Ltd.) such that the thickness of the film dried would be 100 μm, followed by curing, to form a cured coating film (100 μm). Thereby, a test plate was prepared.

Subsequently, the test plate (surface of the cured coating film formed from epoxy binder coating material) was coated by using an applicator with the coating composition of any of the above Examples and Comparative Examples such that the thickness of the film dried would be 150 μm, which was followed by drying at 23° C. for 1 day, to form an antifouling coating film (150 μm). Further, this antifouling coating film surface was coated with the above coating composition such that the thickness of the film dried would be 150 μm, which was followed by drying at 23° C. for 7 days, to form an antifouling coating film. Thereby, a test plate with an antifouling coating film was prepared.

The resultant test plate with the antifouling coating film was immersed in artificial seawater at 50° C. Every one month after the immersion, the appearance and adhesion of the coating film were investigated based on the following evaluation criteria.
Evaluation of Appearance The degree of fracture of the antifouling coating film surface of the test plate with the antifouling coating film was visually observed, and was evaluated in accordance with JIS K5600-8-4 shown in the following Table.

TABLE 7

| Evaluation Point (RN) | Classification of Fracture Amount |
|---|---|
| 0 | None |
| 1 | Density 1 |
| 2 | Density 2 |
| 3 | Density 3 |

Evaluation of Adhesion

The antifouling coating film surface of the test plate with the antifouling coating film was slit with an NT cutter so as to have four cut lines both in the longitudinal direction and the transverse direction with one line spaced from another line by 4 mm, and this resulted in the formation of 9 squares on the coating film surface. On the coating film surface having the squares, a Cellotape (trade mark) was press-contacted and then quickly peeled off. Then, the squares were observed. Subsequently, provided that the area of the 9 squares was 100%, the percentage (%) of the area of the coating film remaining on the squares (remaining area) after the peeling operation was calculated, and based on the following evaluation criteria, adhesion was evaluated.
[Adhesion Evaluation Criteria]
0: the area of the remaining coating film is 95% or more.
1: the area of the remaining coating film is 75 to less than 95%.

2: the area of the remaining coating film is 50 to less than 75%.
3: the area of the remaining coating film is less than 50%.
(5) Coating Film Consumption Property Test Each coating composition obtained in Examples and Comparative Examples was applied by using an applicator on a hard vinyl chloride plate (50 mm×50 mm×1.5 mm) such that the thickness of the film dried would be 150 μm and dried, to prepare a test plate.

The resultant test plate was attached to a rotating drum, and the rotating drum was immersed in seawater. At a seawater temperature of 30° C., the drum was rotated at a circumferential speed of 15 knots, and the thickness of the film consumed was measured every one month. In addition, the monthly average coating film consumption amount from the start of the immersion to 12 months thereafter was calculated. Further, coating film appearance after 12 months from the start of the immersion was observed and evaluated based on the following evaluation criteria.
[Evaluation Criteria of Coating Film Appearance]
AA: the antifouling coating film surface has no cracking.
Cracking: the antifouling coating film surface has cracking.
(6) Static Antifouling Properties Test A sandblasted plate (300 mm×100 mm×3.2 mm) was coated by using an air spray with an epoxy-based coating material (epoxy AC coating material, product name: "Bannoh 500", manufactured by Chugoku Marine Paints, Ltd.) such that the thickness of the film dried would be 150 μm, which was followed by curing, to form a cured coating film (150 μm). Subsequently, the cured coating film was coated by using an air spray with an epoxy binder coating material (product name: "Bannoh 500N", manufactured by Chugoku Marine Paints, Ltd.) such that the thickness of the film dried would be 100 μm, which was followed by curing, to form a cured coating film (100 μm), to thereby prepare a test plate.

Subsequently, the test plate (surface of the cured coating film formed from the epoxy binder coating material) was coated by using an air spray with the coating composition of any of the Examples and Comparative Examples such that the thickness of the film dried would be 150 μm, and then the composition was dried at 23° C. for 1 day to form an antifouling coating film (150 μm). Further, the antifouling coating film surface was coated with the above coating composition such that the thickness of the film dried would be 150 μm, and the then composition was dried at 23° C. for 7 days to form an antifouling coating film. Thereby, a test plate with an antifouling coating film was prepared.

The resultant test plate with the antifouling coating film was stationarily immersed in Nagasaki bay, Nagasaki Prefecture. Every one month after the immersion, the percentage (%) of the area of the antifouling coating film on which aquatic creatures were adhered (adherence area) was measured wherein the total area of the antifouling coating film of the test plate is defined as 100%, and based on the following evaluation criteria the static antifouling properties were evaluated.
[Evaluation Criteria]
0: the adherence area is 0%.
0.5: the adherence area is 0 to 10%.
1: the adherence area is 10 to less than 20%.
2: the adherence area is 20 to less than 30%.
3: the adherence area is 30 to less than 40%.
4: the adherence area is 40 to less than 50%.
5: the adherence area is 50 to 100%.
(7) Storage Stability Test The viscosity at 23° C. of each coating composition immediately (within one day) after prepared in Examples and Comparative Examples (initial viscosity (Ku)) was measured in accordance with JIS K 5400 by using a stormer viscometer. Furthermore, after each coating composition was stored in a 50° C. thermostat for 3 months, the viscosity at 23° C. of each coating composition (viscosity after storage (Ku)) was measured in accordance with JIS K 5400 by using a stormer viscometer. Subsequently, increase of viscosity was calculated based on the following equation.

Viscosity Increase=Viscosity After Storage ($Ku$)−Initial Viscosity ($Ku$)

TABLE 8

| Item | Manufacturer | Properties | Solid content (wt %) |
|---|---|---|---|
| Talc FC-1 | Fukuoka Talc Co., Ltd. | Extender pigment | 100 |
| Zinc oxide | Kyushu Hakusui Kagaku | Extender pigment | 100 |
| Novoperm Red F5RK | Clariant North America | Organic red pigment | 100 |
| Copper Omadine (copper pyrithione) | Arch Chemical, Inc. | Organic antifouling agent | 100 |
| 4,5-dichloro-2-n-octyl-4-isothiazoline-3-one | Rohm & Haas Company | Organic antifouling agent | 30 |
| Rosin | Made in China | Elution assistant | 100 |
| Dis630-20XC | Kusumoto Chemicals, Ltd. | Anti-sagging agent | 20 |
| Dis4200-20X | Kusumoto Chemicals, Ltd. | Anti-settling agent | 20 |
| Cuprous oxide NC-301 | Nissin Chemco Co., Ltd. | Antifouling agent | 100 |
| Titanium white R-5N | Sakai Chemical Industry Co., Ltd. | Color pigment | 100 |
| Versatic acid | Resolution Nederland | Elution assistant | 100 |

The present invention is described with reference to embodiments hereinabove, but the present invention is limited in no way by the above. The configuration and detail of the present invention can have various modifications comprehensible within the scope of the invention by a skilled person in the art.

The present application claims priority from Japanese Patent Application No. 2011-248877 filed on Nov. 14, 2011, and all of the disclosure therein is incorporated hereto.

INDUSTRIAL APPLICABILITY

The present invention is applicable to antifouling coating compositions and antifouling coating films, and is therefore employable for antifouling substrates.

The invention claimed is:
1. An antifouling coating composition, comprising a silylacrylic copolymer (A) which comprises:
  a structural unit (1) derived from triisopropylsilyl methacrylate (i);
  a structural unit (2) derived from triisopropylsilyl acrylate (ii); and
  a structural unit (3) derived from a polymerizable monomer having a polymerizable double bond (iii), which excludes the (i) and (ii), wherein
  a content weight ratio ([(1)+(2)]/(3)) of a total weight ((1)+(2)) of the structural unit (1) and the structural unit (2) to a content weight of the structural unit (3) is from 50/50 to 90/10, and a content weight ratio ((1)/(2)) of the content weight of the structural unit (1) to the content weight of the structural unit (2) is more than 50/50 and not more than 95/5.

2. The composition according to claim 1, wherein the polymerizable monomer (iii) is an ester having a polymerizable double bond, or a carboxylic acid having a polymerizable double bond.

3. The composition according to claim 1, further comprising a rosin, a monocarboxylic acid compound (B), or both.

4. The composition according to claim 3, wherein a content weight ratio ($W_A/W_B$) of a content weight ($W_A$) of the silylacrylic copolymer (A) to a content weight ($W_B$) of the rosin, monocarboxylic acid compound (B), or both, is from 99.9/0.1 to 30/70.

5. The composition according to claim 1, further comprising at least one component selected from the group consisting of
a copper compound (C),
an organic antifouling agent (D),
a solvent (F), and
an additive (E) selected from the group consisting of a plasticizer (e1), an extender pigment (e2), a pigment dispersant (e3), a coloring pigment (e4), an anti-sagging agent (e5), an anti-settling agent (e6) and a dehydrating agent (e7).

6. An antifouling coating film formed by curing the antifouling coating composition according to claim 1.

7. An antifouling substrate formed by a method comprising:
coating or impregnating a substrate with the antifouling coating composition according to claim 1; and
curing the coating composition, to thereby form an antifouling coating film on the substrate.

8. The substrate according to claim 7, wherein the substrate is in contact with seawater or fresh water.

9. The substrate according to claim 7, wherein the substrate is at least one selected from the group consisting of an underwater structure, a ship and a fishing gear.

10. A method for producing an antifouling substrate, comprising:
coating or impregnating a substrate with the antifouling coating composition according to claim 1; and
curing the coating composition, to thereby form an antifouling coating film on the substrate.

11. A silylacrylic copolymer, comprising:
a structural unit (1) derived from triisopropylsilyl methacrylate (i);
a monomer structural unit (2) derived from triisopropylsilyl acrylate (ii); and
a structural unit (3) derived from a polymerizable monomer having a polymerizable double bond (iii), which excludes (i) and (ii), wherein
a content weight ratio ([(1)±(2)]/(3)) of a total weight ((1)+(2)) of the structural unit (1) and the structural unit (2) to a content weight of the structural unit (3) is from 50/50 to 90/10, and
a content weight ratio ((1)/(2)) of the content weight of the structural unit (1) to the content weight of the structural unit (2) is more than 50/50 and not more than 95/5.

* * * * *